May 15, 1934.  F. L. SHELOR  1,958,839
FLUID PRESSURE CONTROLLED BRAKE MECHANISM
Filed Oct. 20, 1931  2 Sheets-Sheet 2
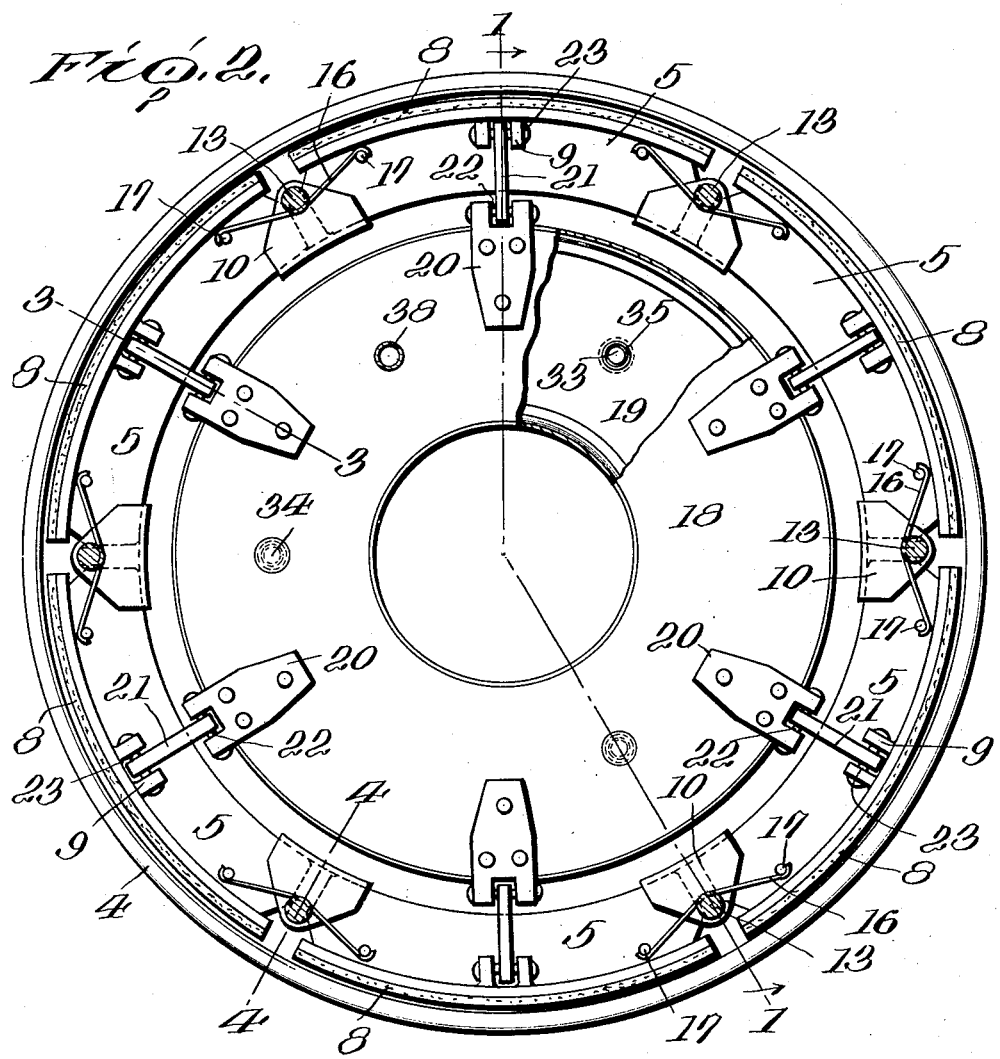
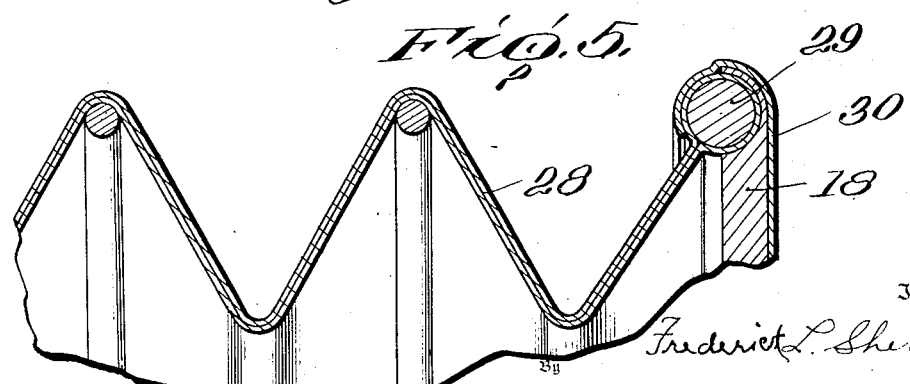
Inventor
Frederick L. Shelor
Sturtevant, Mason & Porter
Attorneys Patented May 15, 1934

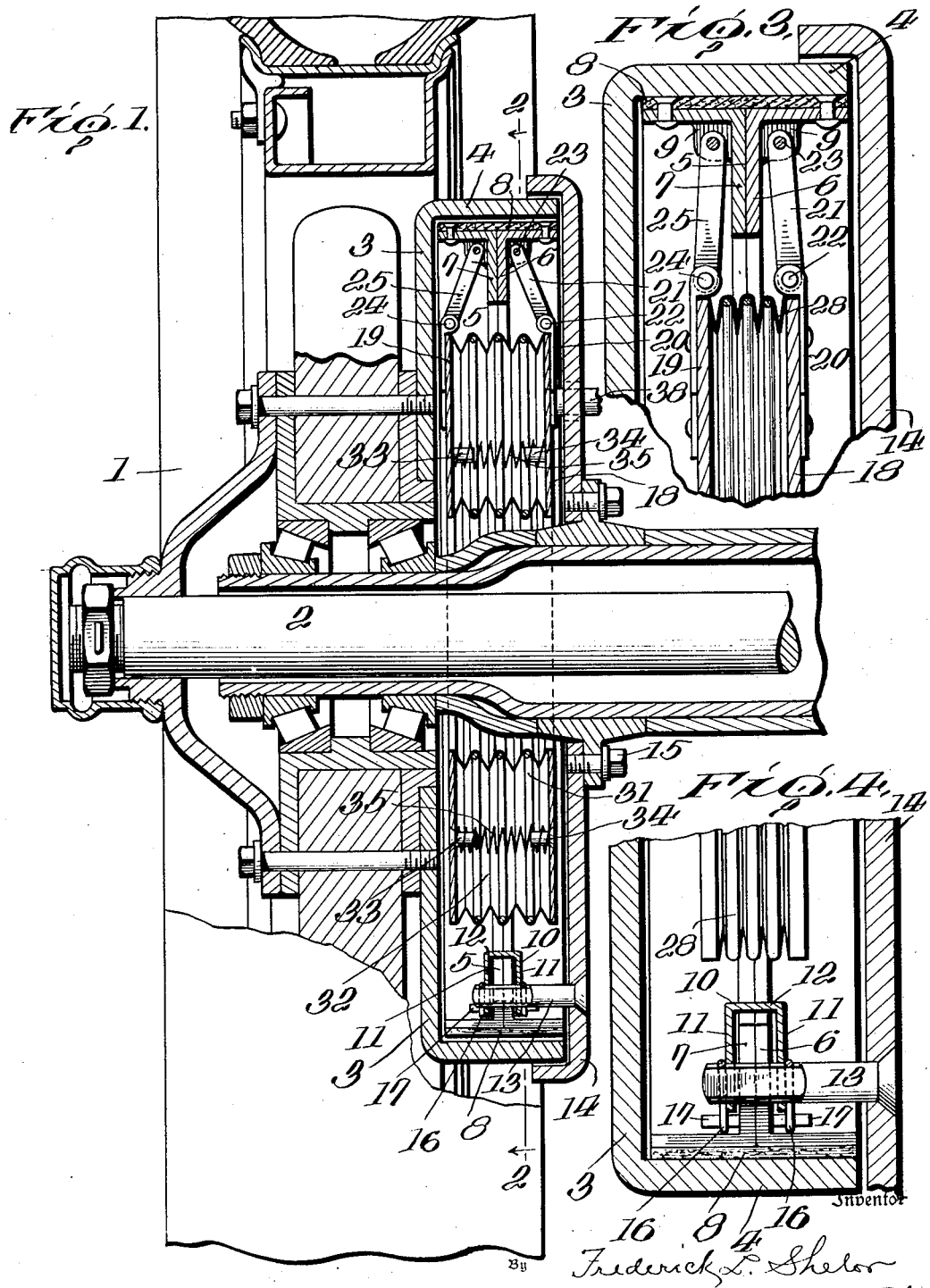

1,958,839

UNITED STATES PATENT OFFICE 1,958,839

FLUID PRESSURE CONTROLLED BRAKE MECHANISM

Frederick L. Shelor, Sandston, Va., assignor, by direct and mesne assignments, to Innovation Brakes Incorporated, Richmond, Va., a corporation of Virginia Application October 20, 1931, Serial No. 569,986

11 Claims. (Cl. 188—152)

The invention relates to new and useful improvements in a brake mechanism and more particularly a fluid pressure controlled brake mechanism.

An object of the invention is to provide a brake mechanism wherein the braking surfaces are moved into contact with each other by spaced disks, wherein the spaced desks are moved relative to each other by fluid pressure, and wherein said disks are disposed within the moving brake member and have a relative movement in a direction axially thereof.

A further object of the invention is to provide a brake mechanism of the above type wherein the disks are annular in form and concentrically disposed relative to the drum, and wherein said disks are connected by collapsible and expanding members, thus forming a chamber by means of which fluid pressure may be exerted on the disks for imparting a relative movement thereto.

A still further object of the invention is to provide a brake mechanism of the above type wherein the disks are connected to the brake shoes by members so that when the disks are moved relative to each other, the brake shoes are moved toward or from the drum depending upon the direction of movement of the disks relative to each other.

A still further object of the invention is to provide a brake mechanism of the above type wherein the members connecting the disks to the brake shoes are so arranged that when the chamber between the disks and flexible members is placed under vacuum, atmospheric pressure against the outer faces of the disks will move the brake shoes into contact with the drum.

These and other objects will in part be obvious and will in part be hereinafter more fully disclosed.

In the drawings which show by way of illustration one embodiment of the invention—

Figure 1 is a sectional view through the brake mechanism embodying the invention showing the same as applied to a vehicle wheel. The brake is shown released, and the section is taken on the line 1—1 of Fig. 2;

Fig. 2 is a sectional view on the line 2—2 of Fig. 1;

Fig. 3 is an enlarged sectional view through a portion of the brake mechanism showing the disks moved toward each other and the brake shoes in braking contact with the drum. The section is taken on the line 3—3 of Fig. 2;

Fig. 4 is a similar sectional view taken on the line 4—4 of Fig. 2; and

Fig. 5 is an enlarged sectional view through a portion of one of the disks and showing a portion of the member which connects the disks and which is adapted to be expanded or collapsed to permit the disks to move toward and from each other.

The invention is directed to a brake mechanism adapted to be applied to any rotating part, but particularly adapted for use in connection with motor vehicles. The brake mechanism includes a drum which is attached to and moves with the wheel. It also includes a stationary member which is held from rotation. Located within the drum is a series of brake shoes, and the means which operates the same. The operating means includes two movable disks which are annular in shape and spaced from each other. These disks are connected by flexible members, thus forming an annular chamber which is completely closed and to which a pipe is connected so that said chamber may be put under vacuum, thus bringing about a movement of the disks toward each other by the atmospheric pressure on the disks. Each brake shoe is provided with a flange, and the brake shoes are spaced a slight distance from each other. There is a saddle embracing the adjacent ends of the brake shoes, and this saddle is supported on the stationary member. The purpose of the saddle is to limit the inward movement of the shoes and support the same when the brake is released. There is a spring associated with each brake shoe which normally moves the brake shoe radially inward into contact with the saddle. The disks are connected by links to the brake shoes, and these links are so disposed that when the disks are moved toward each other, the brake shoes are forced outwardly and into contact with the drum. When the disks are separated, then the spring can move the brake shoes inwardly. Springs are provided for separating the disks, and the disks are moved toward each other by atmospheric pressure, as noted above.

It is thought that the invention will be better understood by a more detailed description of the illustrated embodiment thereof. In the drawings a vehicle wheel is shown at 1 which is carried by an axle 2 on which it is mounted for rotation. This vehicle wheel may be of any desired form, and as noted, the brake mechanism may be applied to a rotating wheel of other types than vehicle wheels. Attached to the rotating wheel is a brake drum 3 including a radial member which is bolted to the wheel, and an overhanging flanged member 4 with which the brake shoes cooperate. As shown in the drawings, there are six brake shoes. They are all similar in construction, and a description of one will answer for the rest. The brake shoes are indicated at 5, 5. Each brake shoe consists of two angular members 6 and 7. Each angular member includes a radially extending rib and a circumferentially extending flanged portion. Attached to the two angular members is a lining 8 which as shown in the drawings, joins the two members 6 and 7. These members 6 and 7 are provided with lugs 9 on their inner faces. At the adjacent ends of the brake shoes there is a saddle 10. When there are six brake shoes, then there are six saddles. These saddles are U-shaped in cross section, thus providing side portions 11, 11 and a bottom portion 12. The saddle has an opening therethrough and is mounted on a pin 13 which extends through these openings. The pin 13 is rigidly fixed to a stationary disk member 14 bolted at 15 to the sleeve axle of the wheel. A spring 16 engages over pins 17, 17 on the brake shoes, and passes underneath the pin 13 which is fixed to the stationary member 14. The pin 13 has a seating groove for the spring 16, and there are two springs 16 associated with each saddle. These springs are normally tending to move the brake shoes inwardly toward the center of the drum and the inward movement of the shoes is limited by engagement of the shoe with the bottom of the saddle 10. This is the normal off position of the brake shoes, and the brake shoes at this time are supported concentric to the drum and out of contact therewith. Located between the stationary member 14 and the radial member 3 of the drum is the operating means for moving the brake shoes. This operating means consists of two disks 18 and 19. The disk 18 is provided with a bracket 20 to which a link 21 is pivoted at 22. This link 21 is also pivoted at 23 to the lug 9 on the brake shoe. The disk 19 carries a bracket 24. A link 25 is pivoted at 26 to this bracket, and at 27 to the lug 9 of the brake shoe.

The disks 18 and 19 are connected by a member 28 which is of a flexible character so that it may be expanded or contracted. As shown in Fig. 5 this member is attached to a rod 29 which in turn is secured to the disk 18. This flexible member may be of leather, fabric or metal, or any suitable material which is impervious to the air, and which is capable of collapsing or expanding, so that a closed chamber may be formed between the disks 18 and 19. As shown in the drawings, these members are in the form of a sylphon bellows. The disk 18 has a covering 30 applied thereto which makes a tight joint with the rod and the flexible member 28. This flexible member 28 is connected in a similar manner to the disk 19. There is also a flexible member 31 at the inner edges of the disks 18 and 19 which is connected to the disks and this forms a chamber 32 between the disks, which chamber is in the form of an annulus. The disks 18 and 19 are provided with suitable supporting lugs 33 and 34. Carried by these lugs is a compression spring 35. There are a series of these springs located at suitable intervals between the disks and the springs normally operate to separate the disks. A tube or pipe 38 extends freely through an opening in the stationary member 14 and is connected to the movable disk 18 moving therewith. This pipe may be connected to a suitable vacuum creating means with a valve controlling mechanism therein, and thus it is that the chamber between the disks may be placed under vacuum. When placed under vacuum, then the atmospheric pressure on the disks 18 and 19 will cause the disks to move toward each other. The links 21 and 25 are so disposed that when these disks move toward each other, the brake shoes will be forced outwardly and into contact with the brake drum. When the chamber is open to the atmosphere and the pressure on opposite sides of the disks 18 and 19 is balanced, then the springs 35 will force the disks away from each other, drawing in on the brake shoes, and the brake shoes, through the aid of the springs 16 will be all relieved from contact with the drum, and brought into engagement with the bottom of the saddles associated therewith. The disks 18 and 19 are supported by the links and through the links are supported by the brake shoes.

It will be noted that the disks 18 and 19 and also the chamber which is placed under vacuum are annular in form. These disks have a central opening only sufficient to permit the passing of the parts therethrough which support the vehicle wheel. The links can be made relatively short, and therefore, the surface area of the disks is relatively large, so that the atmospheric pressure is multiplied to an extent so that ample brake pressure is obtained.

It is obvious that changes in the details of construction and the arrangement of the parts may be made without departing from the spirit of the invention as set forth in the appended claims.

Having thus described the invention, what I claim as new and desire to secure by Letters-Patent, is—

1. In a brake mechanism, the combination of a rotating member, a brake drum attached thereto, a member held from rotation, a series of segmental brake shoes supported thereon for radial movement, spaced members connected to the brake shoes and shiftable relative to each other laterally of the rotating member for moving the brake shoes into and out of contact with the brake drum, flexible means connecting said spaced members and forming an air-tight chamber therebetween adapted to be placed under pressure differing from the atmospheric pressure on the outer face of said spaced members.

2. In a brake mechanism, the combination of a rotating member, a brake drum attached thereto, a member held from rotation, a series of segmental brake shoes supported thereon for radial movement, spaced members connected to the brake shoes and shiftable relative to each other laterally to the rotating member for moving the brake shoes into and out of contact with the brake drum, flexible means connecting said spaced members and forming an airtight chamber therebetween, spring means for moving said spaced members away from each other for retracting the brake shoes from engagement with the drum, and means connected to said chamber for placing the same under a vacuum for shifting said spaced members toward each other for moving the brake shoes into contact with the brake drum.

3. In a brake mechanism, the combination of a rotating member, a brake drum attached thereto, a member held from rotation, a series of segmental brake shoes supported thereon for radial movement, spaced annular members located concentric of the brake drum, flexible members connecting said spaced members and forming therebetween an annular air-tight chamber, means for connecting the spaced members to said brake shoes whereby a movement of the spaced members relative to each other will move the brake shoes into and out of contact with the brake drum, and means connected to said chamber for placing the same under vacuum so that atmospheric pressure on said spaced members will move the same toward each other and move the brake shoes into contact with the brake drum.

4. In a brake mechanism, the combination of a rotating member, a brake drum attached thereto, a member held from rotation, a series of segmental brake shoes supported thereon for radial movement, spaced annular members located concentric of the brake drum, flexible members connecting said spaced members and forming therebetween an annular air-tight chamber, means for connecting the spaced members to said brake shoes whereby a movement of the spaced members relative to each other will move the brake shoes into and out of contact with the brake drum, and means connected to said chamber for placing the same under vacuum so that atmospheric pressure on said spaced members will move the same toward each other and move the brake shoes into contact with the brake drum, and spring means for moving said spaced members away from each other for retracting the brake shoes from engagement with the drum.

5. In a brake mechanism, the combination of a rotating member, a brake drum attached thereto, a member held from rotation, a series of segmental brake shoes supported thereon for radial movement, spaced annular members located concentric to the brake drum, flexible members connecting said spaced members and forming therebetween an annular chamber, links connecting said spaced members to said brake shoes, springs located between said spaced members for separating the same, and means connected to said chamber for placing the same under vacuum so that atmospheric pressure on said spaced members will move the same toward each other, said links being so disposed as to move the brake shoes into contact with the drum when said spaced members are moved toward each other, and to move the brake shoes away from the drum when said spaced members are separated.

6. In a brake mechanism, the combination of a rotatable member, a brake drum attached thereto, a series of segmental brake shoes located within the drum, a member held from rotation and carrying a series of supporting pins, a saddle mounted on each pin and adapted to support the brake shoes when moved from contact with the drum, spaced annular members connected to the brake shoes and shiftable relative to each other laterally of the rotatable member for moving the brake shoes into and out of contact with the brake drum, flexible means connecting said spaced members and forming an air-tight chamber and means connected to said chamber for placing the same under vacuum so that atmospheric pressure on the spaced members will move the same toward each other, and spring means operating to separate the brake shoes from the drum when said chamber is released from vacuum.

7. In a brake mechanism, the combination of a rotatable member, a brake drum attached thereto, a series of segmental brake shoes located within the drum, a member held from rotation and carrying a series of supporting pins, a saddle mounted on each pin and adapted to support the brake shoes when moved from contact with the drum, spaced members located within the brake drum, links connecting the spaced members to the brake shoes, flexible means connecting the spaced members and forming an air-tight chamber and means connected to said chamber for placing the same under vacuum for moving said spaced members relative to each other for causing the brake shoes to contact with the brake drum.

8. In a brake mechanism, the combination of a rotatable member, a brake drum attached thereto, a series of segmental brake shoes located within the drum, a member held from rotation and carrying a series of supporting pins, a saddle mounted on each pin and adapted to support the brake shoes when moved from contact with the drum, spaced members located within the brake drum, links connecting the spaced members to the brake shoes, flexible means connecting the spaced members and forming an air-tight chamber and means connected to said chamber for placing the same under vacuum for moving said spaced members relative to each other for causing the brake shoes to contact with the brake drum, and spring means operating on said spaced members for retracting the brake shoe from contact with the drum when the vacuum is released.

9. In a brake mechanism, the combination of a rotatable member, a brake drum attached thereto, a series of segmental brake shoes located within the drum, a member held from rotation and carrying a series of supporting pins, a saddle mounted on each pin and adapted to support the brake shoes when moved from contact with the drum, spaced annular members located within said brake drum, flexible members connecting said annular members and forming therebetween an annular chamber, links connecting said spaced members with the brake shoes and disposed so that when said spaced members are moved toward each other the brake shoes are moved outward into contact with the brake drum, and means whereby said chamber may be placed under vacuum and said spaced members moved by atmospheric pressure toward each other.

10. In a brake mechanism, the combination of a rotatable member, a brake drum attached thereto, a series of segmental brake shoes located within the drum, a member held from rotation and carrying a series of supporting pins, a saddle mounted on each pin and adapted to support the brake shoes when moved from contact with the drum, spaced annular members located within the brake drum, flexible members connecting said annular members and forming therebetween an annular chamber, links connecting said spaced members with the brake shoes and disposed so that when said spaced members are moved toward each other the brake shoes are moved outward into contact with the brake drum, means whereby said chamber may be placed under vacuum and said spaced members moved by atmospheric pressure toward each other, and springs located between said spaced members within said chamber for separating said members when the chamber is connected to the atmosphere.

11. In a brake mechanism, the combination of a rotating member, a brake drum attached thereto, a member held from rotation, a series of segmental brake shoes mounted thereon for radial movement, spaced members connected to said brake shoes and shiftable toward and from each other for moving said brake shoes into and out of contact with the brake drum, flexible means connecting the spaced members and forming an air-tight chamber, spring means for separating said members to relieve the brake and means connected to said chamber for placing the same under vacuum for moving the spaced members toward each other for applying the brake.

FREDERICK L. SHELOR.